United States Patent [19]
Gochee

[11] Patent Number: 5,732,272
[45] Date of Patent: Mar. 24, 1998

[54] SUBROUTINE EXECUTION TIME TRACER

[75] Inventor: James R. Gochee, Cupertino, Calif.

[73] Assignee: Apple Computer, Inc., Cuppertino, Calif.

[21] Appl. No.: 509,184

[22] Filed: Jul. 31, 1995

[51] Int. Cl.⁶ ................................................. G06F 9/40
[52] U.S. Cl. ...................... 395/704; 395/183.14
[58] Field of Search ................... 395/704, 183.11, 395/183.14

[56] References Cited

U.S. PATENT DOCUMENTS

| | | | |
|---|---|---|---|
| 3,909,797 | 9/1975 | Goss et al. | 340/172.5 |
| 4,488,227 | 12/1984 | Miu et al. | 364/200 |
| 5,016,164 | 5/1991 | Srivastava | 364/200 |
| 5,274,817 | 12/1993 | Stahl | 395/700 |
| 5,276,882 | 1/1994 | Emma et al. | 395/700 |
| 5,301,325 | 4/1994 | Benson | 395/700 |
| 5,454,086 | 9/1995 | Alpert et al. | 395/375 |
| 5,528,753 | 6/1996 | Fortin | 395/183.11 |
| 5,604,877 | 2/1997 | Hoyt et al. | 395/590 |

OTHER PUBLICATIONS

"Microcomputer Systems: The 8086/8088 Family", Liu et al., Prentice Hall, 1986, pp. 145–147.

Primary Examiner—Kevin A. Kriess
Assistant Examiner—Kakali Chaki
Attorney, Agent, or Firm—Hickman Beyer & Weaver, LLP

[57] ABSTRACT

A subroutine execution time tracer that is able to trace execution times of software subroutines regardless of whether the subroutines are invoked or exited using standard or non-standard subroutine calling conventions is described. A head patch is placed at the beginning of a software subroutine, and a tail patch is placed at the end of the software routine. The invention uses the head patch to examine the return address on the system stack before replacing the return address with the address of a tail patch. If the return address on the system stack already corresponds to a tail patch, then a counter associated with the tail patch is incremented. The counter serves to notify the tail patch that when invoked it must log an additional exit event. This allows subroutines which "jump" to other subroutines (i.e., non-standard subroutine calls) to be properly traced. The invention also configures the tail patch as an internal code stack. The code stack ensures that every exit event will be properly logged and the subroutines will have been successfully traced regardless of whether the subroutines have modified the system stack with non-standard calling conventions. The invention can be implemented as a method, an apparatus, a system or a computer readable medium.

20 Claims, 7 Drawing Sheets

SUBROUTINE EXECUTION TIME TRACER

BACKGROUND OF THE INVENTION

1. Field of the Invention

The present invention relates to performance evaluation of computer code, and more particularly, to subroutine execution time tracing.

2. Description of the Related Art

Software developers produce computer code for computers. Typically, the computer code has a modular design implemented using subroutines.

FIG. 1 is a diagram illustrating a subroutine call operation 100. The subroutine call operation 100 includes a calling routine 102 and a subroutine 104. The calling routine 102 and the subroutine 104 contain computer code which is executable by a computer. As is conventional and well-known in the art, parameters which are to be saved are pushed on a system stack prior to calling to the subroutine 104. After pushing the parameters onto the system stack, the subroutine 104 is called using a jump to subroutine command (e.g., "jsr" instruction for the Motorola 68000 processor) which causes a return address to be saved on a system data stack and then causes the program counter to point to the code associated with the subroutine 104. The computer executing the calling routine 102 thereafter executes the subroutine 104. The last command of the subroutine 104 is a return command (e.g., "rts" instruction for the Motorola 68000 processor). When the return command is executed, the return address which was previously stored on the system stack is pulled off the system stack. The program counter is then reset in accordance with the return address. Hence, the program counter then again points to code within the calling subroutine 102. The subroutine call operation 100 illustrated in FIG. 1 is a standard call to a subroutine that is well known in the art.

In order to evaluate the performance of computer code, execution time of the computer code is measured. Although the overall execution time of the computer code can be measured with little difficulty, measuring the execution time of software subroutines within the computer code is more difficult. However, to effectively evaluate execution time of computer code, it is necessary to monitor the execution time of individual software subroutines.

The execution time of software subroutines can be measured by tracing the subroutine. Tracing a software subroutine is loosely defined as recording an entry and exit of the subroutine. A software subroutine is invoked (entered) by "calling" the subroutine from other computer code. The subroutine completes (exits) by "returning" from the subroutine to the place (or just after the place) in the computer code which called the subroutine. The conventional approach to tracing subroutine calls begins with a patch placed at the beginning of a subroutine. The patch is a small block of code known as a "head patch". When the head patch is executed, it logs a subroutine start event that includes a time stamp into a buffer. The head patch then pushes a new element onto an internal data stack. The new element placed on the data stack contains subroutine information and the return address of the caller of the subroutine. The head patch also replaces the caller's return address on a system stack with the address of a "tail patch". The tail patch is a small block of code that will execute at the end of the subroutine. When the tail patch is executed, it is assumed that the subroutine on the top of the internal data stack just returned. Accordingly, the tail patch logs a subroutine exit event that includes a time stamp into the buffer, and then pops the top element off of the internal data stack so as to return to the original caller of the subroutine.

Hence, the conventional approach to tracing software subroutines is to use a tracing program which is patched into the beginning and end of a subroutine call. These patches allow the start time and end time of the software subroutine to be recorded.

The conventional tracing approach assumes that each subroutine is called in a standard way (i.e., standard calling convention). Namely, the standard subroutine call uses an assembly language instruction that stores the address of the caller in a well-known location, such as the top of the system stack on the 68000 processor. It also assumes that every subroutine in the system will return in a standard way. Namely, the standard subroutine return causes a subroutine to return to its caller by jumping to the stored address of the caller of the subroutine, such as with an "rts" instruction on the 68000 processor. Thus, the standard calling convention is meant to include both the standard subroutine call and the standard subroutine return.

Although the conventional tracing approach works correctly in many cases, many computer programs call subroutines in non-standard ways. By non-standard ways, it is meant all ways which violate the standard calling conventions. The problem is that conventional tracing programs are unable to monitor the execution time of software subroutines called in non-standard ways. For example, the MacOS used with the Macintosh computer line produced by Apple Computer, Inc. has several system subroutines which violate standard subroutine calling conventions in one of two ways.

First, to improve execution time, subroutines violate standard calling conventions by manipulating the system stack by manually unwinding several levels of callers, rather than allowing the standard subroutine return mechanism (such as associated with the "rts" instruction for the Motorola 68000 processor) to do it automatically. What can happen is that the current subroutine in a chain of subroutine calls can decide to return to the original caller of the entire chain. To do this, the subroutine manually adjusts the system stack, then performs a normal subroutine return. This creates a problem for the conventional tracing approach because the system stack contains information which is vital to the tracing of each subroutine in a chain of calls. Namely, the standard tracing mechanism looses all of the tail patches it had put into the system stack and it will not be able to log exit events for the subroutines it was tracing.

Second, the conventional tracing approach does not work properly when non-standard calling conventions are used to call a subroutine with an assembly language instruction that does not push the return address of the caller on the system stack. An example of a non-standard subroutine call would be a "jump" call to subroutine (such as "jmp" instruction for the Motorola 68000 processor) because no new return address is saved. The conventional tracing approach does not operate correctly in this case because manipulation of the return address on the system stack is necessary for the conventional tracing approach to gain control after a subroutine has completed execution. As a result, the head patch will log an entry for both subroutines, however, only one subroutine exit will be logged. This is because the tail patch will only be returned to once, since the first subroutine did not record a distinct return address when it called the second subroutine. So when the second subroutine returns, the tail patch is invoked and the tracing mechanism correctly thinks that the second subroutine is exiting. However, the first subroutine still has an element on the internal data stack which will never be taken off because the tail patch address is only called once. Consequently, the conventional tracing approach is unable to trace execution times of subroutines using non-standard calling conventions.

Thus, there is need for an improved tracing technique in which execution times of subroutines can be accurately traced despite being called in non-standard ways.

SUMMARY OF THE INVENTION

Broadly speaking, the invention is an improved software subroutine tracing technique which is able to trace execution times of subroutines that use non-standard calling conventions. The invention can be implemented numerous ways, including as a method, an apparatus or a system, or on a computer readable medium.

As a method for tracing execution time of subroutines being executed by a computer system, the invention includes the operations of: calling a subroutine; recording a start log when the subroutine begins execution; executing the subroutine; after executing the subroutine, determining if a return from the subroutine would leave subsequently invoked and executed subroutines without an exit log; recording an exit log for the subsequently invoked and executed subroutines when the determining operation determines that a return from the subroutine would leave subsequently invoked and executed subroutines without an exit log; and thereafter recording an exit log for the subroutine. Preferably, the recording of the start log is achieved by head patch code associated with the subroutine, and the determining operation and the recording of the exit log are achieved by tail patch code. The tail patch code is preferably arranged in a code stack containing executable computer code.

As a first embodiment of a system for tracing execution time of subroutines being executed by a computer system, the invention includes: head patch code inserted at the beginning of each subroutine to log a start indicator, and tail patch code inserted at the end of a subroutine to log an end indicator. The tail patch code is arranged in a code stack of one or more code blocks. Preferably, the head patch code includes comparison means for comparing a subroutine return address of a subroutine being invoked with start addresses of the one or more code blocks, and the tail patch code includes determination means for determining whether the corresponding address from a first temporary storage area points to the code block on the top of the code stack. Further, it is preferred that when the comparison means determines that the subroutine return address matches one of the start addresses of the one or more code blocks, a count value associated with the code block having the matching starting address is incremented. Also, the tail patch records an exit event for subroutines without an exit log although invoked after the subroutine returning was invoked, and then records an exit log for the subroutine.

As a second embodiment of a system for tracing execution time of software subroutines, the invention includes: a storage system for storing a program and software subroutines having executable instructions, the program utilizing one or more of the software subroutines; and a CPU for executing the executable instructions. The storage system is arranged so as to include at least: head patch code for each of the software subroutines executed by the CPU; a system stack for storing a subroutine return address, the subroutine return address being one of an address of tail patch code for certain software subroutines being executed by the CPU and an original return address for the certain software subroutines being executed by the CPU; an internal data stack for storing the original return address for the certain software subroutines being executed by the CPU; and a code stack for storing executable code blocks in a stack, the executable code including the tail patch code for each of the certain software subroutines being executed by the CPU.

The invention provides an advantage over conventional schemes because it is able to accurately trace non-standard subroutine calls.

Conventional schemes have heretofore been unable to trace non-standard subroutine calls.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
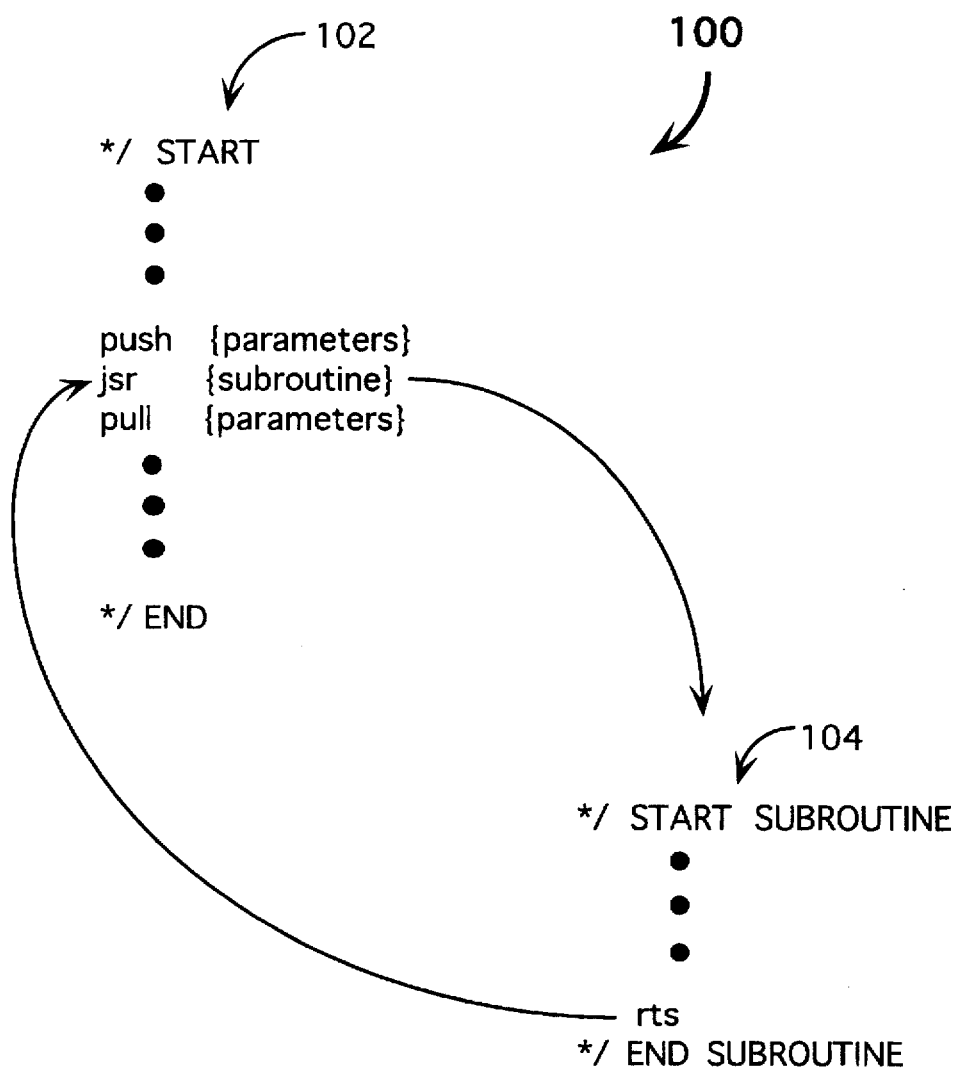
FIG. 1 is a diagram illustrating a subroutine operation.

Embodiments of the invention are discussed below with reference to FIGS. 2 and 5–7. However, those skilled in the art will readily appreciate that the detailed description given herein with respect to these figures is for explanatory purposes as the invention extends beyond these limited embodiments.

The invention pertains to a subroutine execution time tracer that is able to trace execution times of software subroutines regardless of whether the subroutines are invoked or exited using standard or nonstandard subroutine calling conventions. A head patch placed at the beginning of a software subroutine, and a tail patch placed at the end of the software routine. There are two aspects to the invention. Each aspect allows tracing of different types of non-standard subroutine calls.

The first aspect of the invention uses the head patch to examine the return address on the system stack before replacing the return address with the address of a tail patch function. If the return address on the system stack already corresponds to a tail patch, then a counter associated with the tail patch is incremented. The counter serves to notify the tail patch that when invoked it must log an additional exit event. Namely, if a subroutine is called with a jump call (in a non-standard but legitimate way), the counter associated with the tail patch will be incremented for the subroutine so that additional exit events are be logged by the tail patch. This allows subroutines which "jump" to other subroutines (i.e., non-standard subroutine calls) to be properly traced.

The second aspect of the invention involves configuring the tail patch as an internal code stack. A code stack is like a data stack in that it is a stack structure constructed in memory of a computer system, but differs in that the contents of the code stack are executable code rather than data. Preferably, code is not "pushed" onto the code stack, rather the code stack is constructed at initialization time with a fixed number of code blocks. When the code stack grows, a stack pointer is simply adjusted so as to add code blocks because the code blocks are already in place. When the head patch executes for a standard subroutine call, it will assign a new code block onto the code stack and replace the original caller's address with the address of the new element. In this way, each subroutine in a call chain gets its own unique tail patch address on the system stack. When a subroutine is jump called, the stack pointer is used to increment the counter associated with the code stack or tail patch. When a tail patch executes, it checks to see if it is the top item on the code stack. If the tail patch is not the top item, then it assumes that the system stack has been altered. It will then proceed to tear down the code stack, logging exit events for each tail patch on the code stack that did not get a chance to execute. In this way, every exit event will be properly logged and the subroutines will have been successfully traced regardless of whether the subroutines have modified the system stack.

Figure 2:
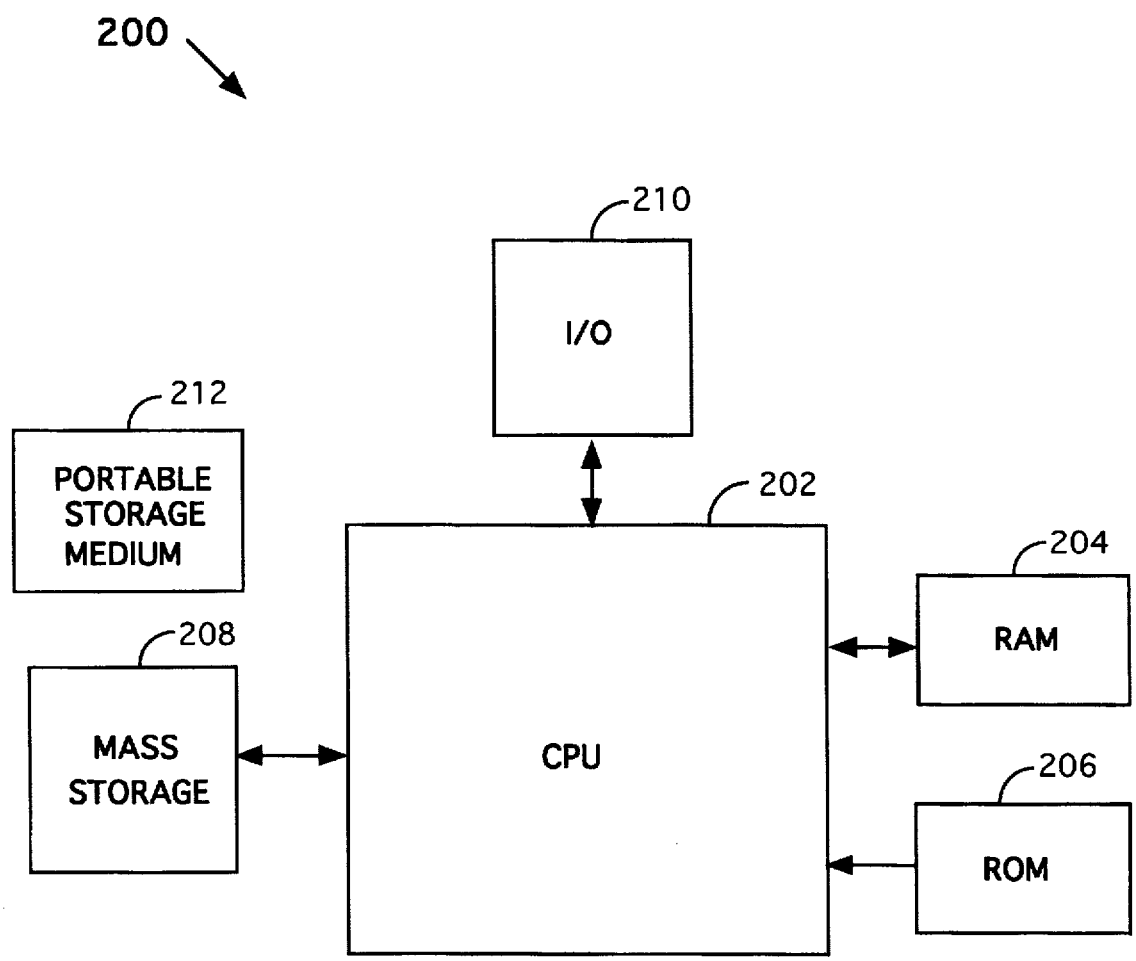
FIG. 2 is a schematic diagram of a representative computer system on which tracing according to the invention can be performed.

FIG. 2 is a schematic diagram of a representative computer system 200 on which tracing according to the invention can be performed. Computer system 200 includes a central processing unit (CPU) 202 which is coupled bidirectionally with random access memory (RAM) 204 and unidirectionally with read only memory (ROM) 206. The mass storage device 208, such as a hard disk, CD ROM drive, magneto-optical drive, tape drive or the like, is coupled bidirectionally with CPU 202. Mass storage device 208 generally includes additional programming instructions and data that typically are not in active use by the CPU 202. The computer system 200 further includes an input/output source 210 that typically includes input media such as a keyboard, pointer devices (e.g., a mouse or stylus) and/or network connections. Additional mass storage devices (not shown) may also be connected to CPU 202 through a network connection. The CPU 202 together with an operating system (not shown) operate to execute computer code. The computer code may reside on the RAM 204, the ROM 206, or a mass storage device 208. The computer code could also reside on a portable storage medium 212 and then loaded or installed onto the computer 200 when needed. Portable storage mediums 212 are computer readable and include, for example, CD-ROMS, PCMCIA devices, RAM devices, floppy disk, magnetic tape, and the like. It will be appreciated by those skilled in the art that the above described hardware and software elements, as well as networking devices are of standard design and construction, and will be well familiar to those skilled in the art.

The invention resides in software subroutine tracing techniques implemented by a computer system (such as the computer system 200 shown in FIG. 2). The software subroutine tracing techniques are described in detail below with reference to FIGS. 5-7. However, before describing the detailed operations of the subroutine tracing techniques, two examples of non-standard subroutine calls are described with reference to FIGS. 3 and 4.

Figure 3:
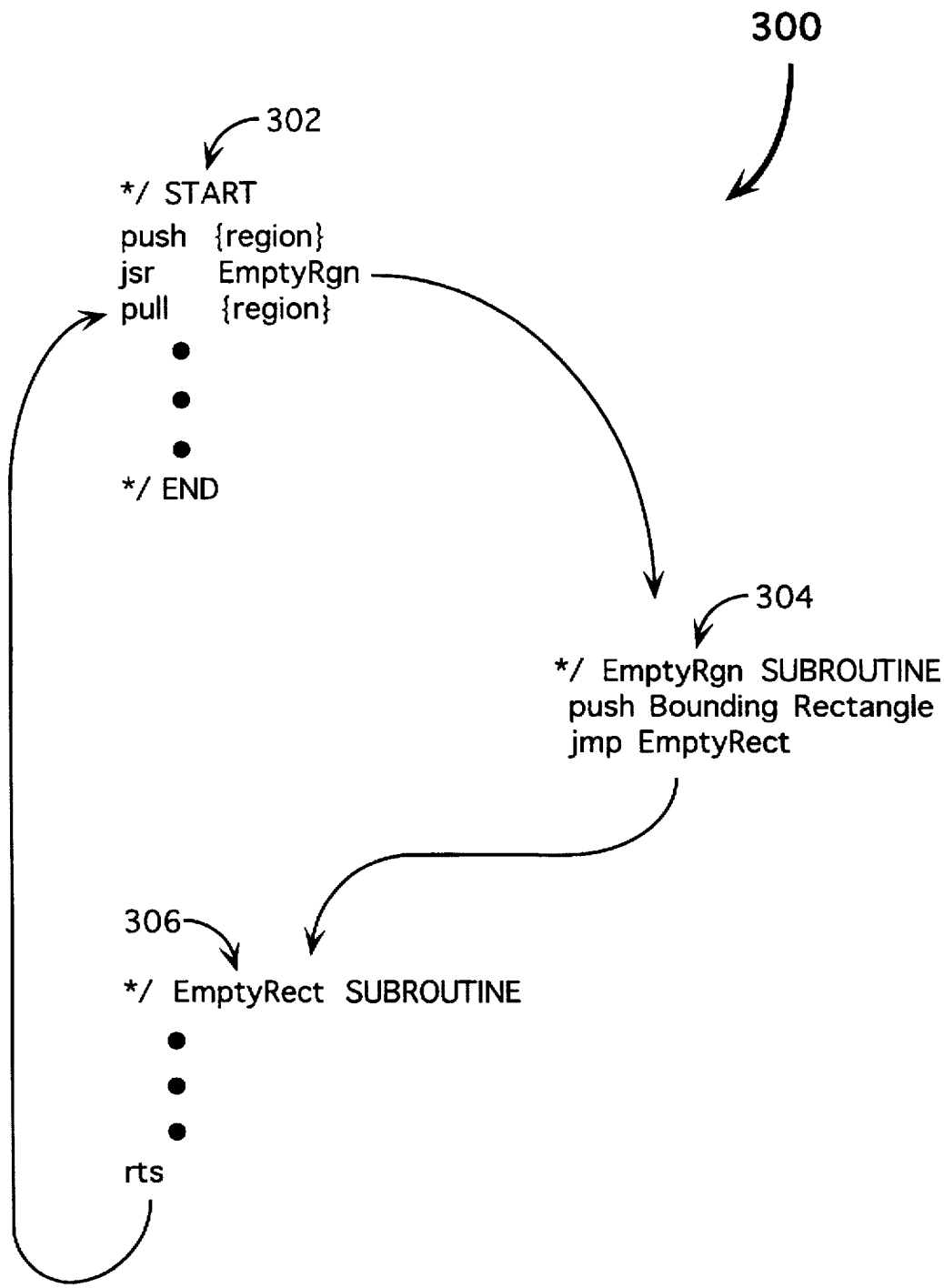
FIG. 3 is a diagram illustrating a non-conventional subroutine call within a software program.

FIG. 3 is a diagram illustrating a non-standard subroutine call within a software program 300. The software program 300 includes a calling routine 302, a first subroutine 304 and a second subroutine 306. The calling routine 302 jumps to the first subroutine (e.g., EmptyRgn in Macintosh computers) 304 when it executes the "jsr" instruction. This jump to subroutine is an example of a standard subroutine call. However, the first subroutine 304 uses a non-standard subroutine call. Namely, the first subroutine 304 violates standard calling conventions because it ends with a jump instruction (such as the "jmp" instruction for the Motorola 68000 processor). In particular, the first subroutine 304 upon is completion jumps to the second subroutine 306 (e.g., EmptyRect in Macintosh computers) using the jump instruction "jmp". The jump instruction "jmp"), unlike the jump to subroutine instruction "jsr"), does not push a return address onto the system stack. As a result, the first subroutine 304 is not properly traced because the conventional tracing approach does not know when the first subroutine 304 completed. When the second subroutine 306 is completed, a return instruction ("rts") causes program execution to return to the calling routine 304 at the position following the initial jump to subroutine instruction. In this example, the "pull" command of the calling routine 302 would be executed next as it immediately follows the jump to subroutine instruction ("jsr"). Hence, although the second subroutine 306 in this example may have been properly traced by the conventional tracing techniques, the first subroutine 304 is not properly traced and, in fact, has a residual return address left on the internal data stack.

Figure 4:
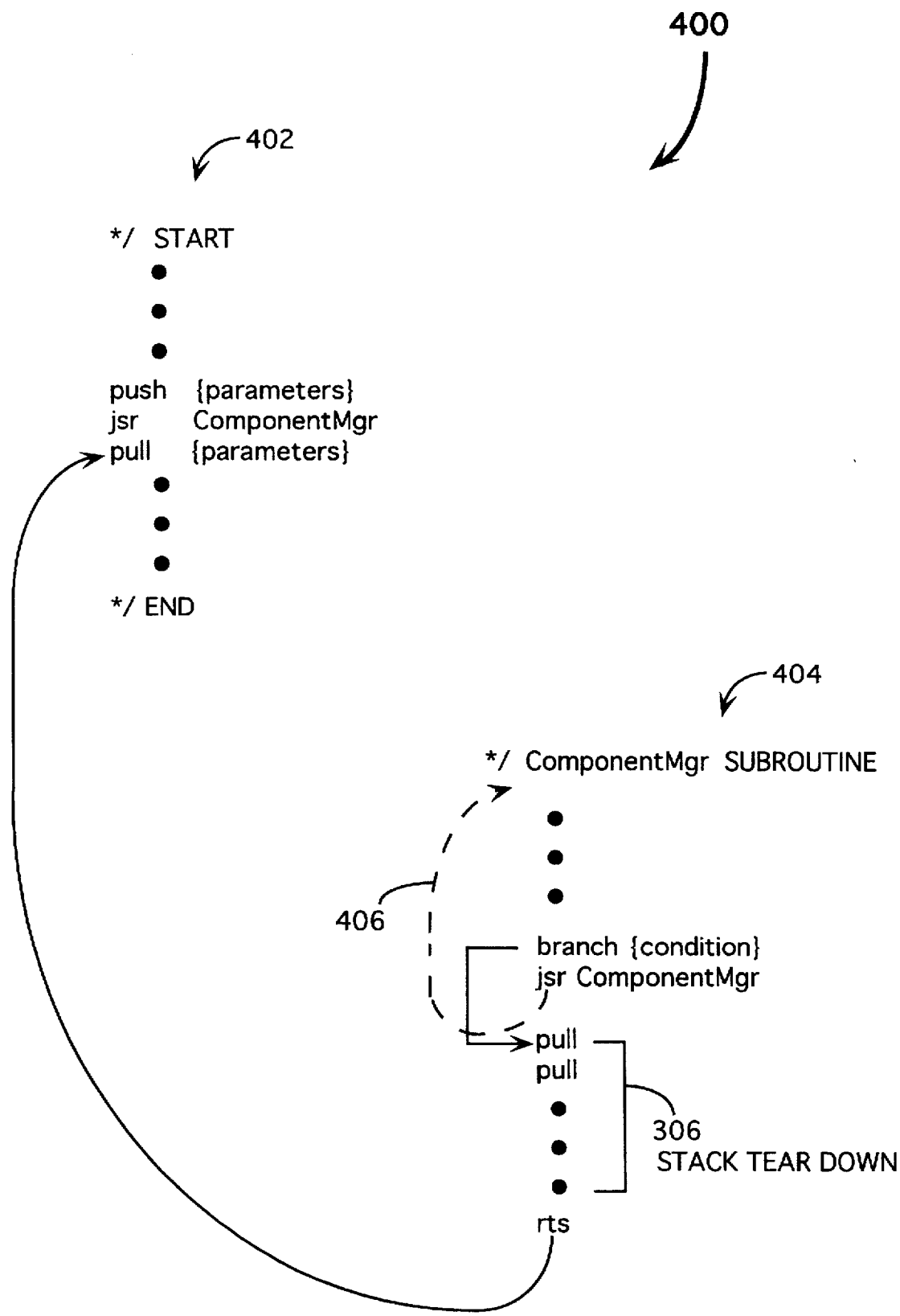
FIG. 4 is a diagram illustrating another non-standard subroutine call within a software program.

FIG. 4 is a diagram illustrating a software program 400 which includes a calling routine 402 and a subroutine 404. In this example, the calling routine 402 jumps to the subroutine 404 known as a Component MGR subroutine. The Component MGR subroutine 404 is a system subroutine associated with Macintosh computers. The Component MGR subroutine 404 uses a non-standard subroutine calling technique for performance reasons. Here, the Component MGR subroutine 404 is able to recursively call itself, and when doing so, creates a chain of subroutine calls. However, the organization of the Component MGR subroutine 404 is such that once the subroutine is completed, the system stack is torn down by pulling off the contents of the data items placed on the system stack from the multiple recursive calls (406). The problem is that the tearing-down of the stack causes the tail patch addresses for the subroutine calls in the chain to be lost. As a result, the conventional tracing approaches are not able to trace the execution time of the subroutine 404.

A tracing system or method according to the invention is able to trace software subroutines regardless of whether they follow standard calling conventions. To do so, a head patch is placed at the beginning of the subroutine and a tail patch is placed at the end of the subroutine. The processing performed by the head patch and the tail patch are described in detail below.

Figure 5:
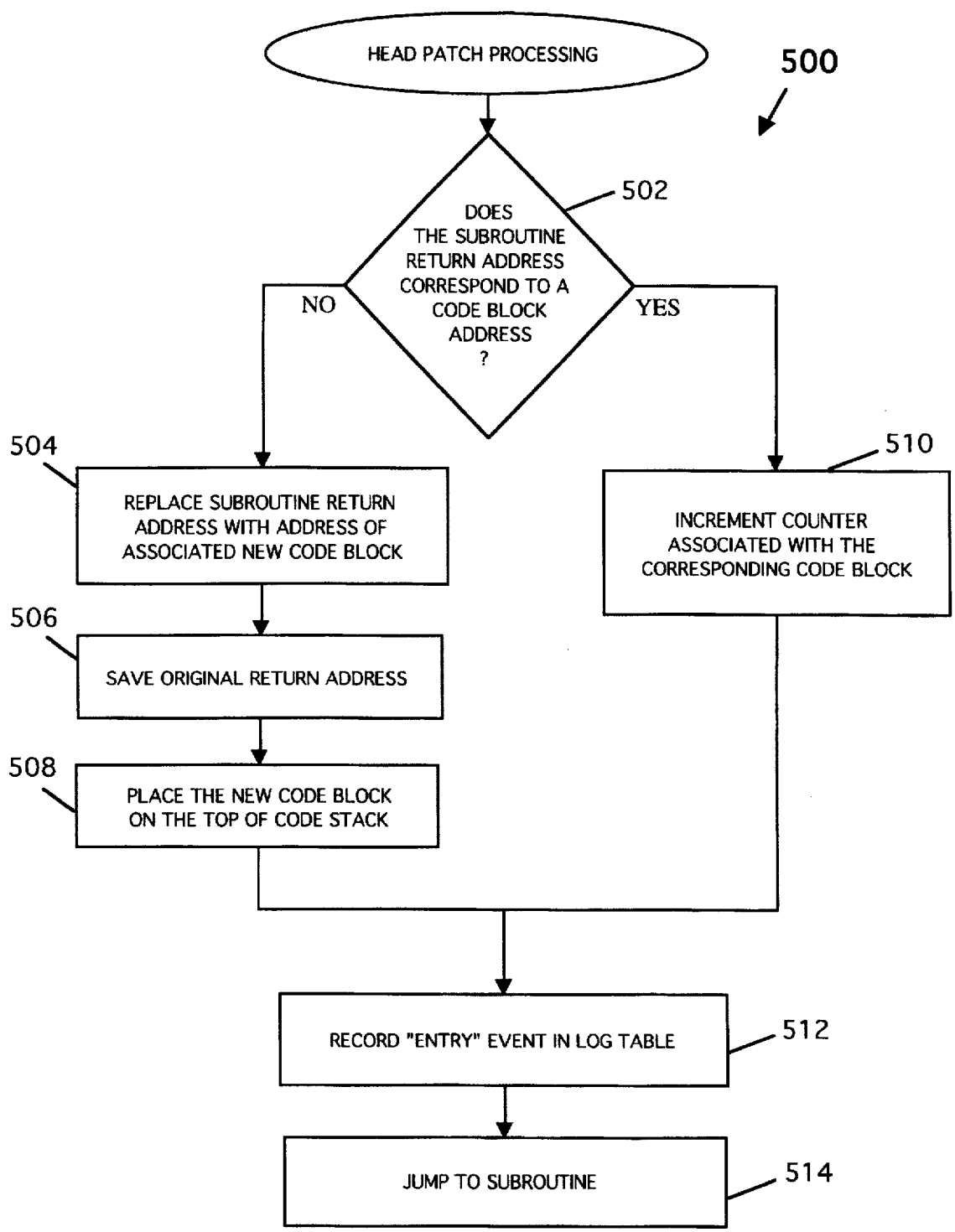
FIG. 5 is a flow chart illustrating head patch processing according to an embodiment of the invention.

FIG. 5 is a flow chart illustrating head patch processing 500 according to an embodiment of the invention. The head patch processing 500 is performed by a head patch according to the invention. The head patch processing 500 begins with a decision 502. The decision 502 determines whether or not the subroutine return address corresponds to a code block address. The subroutine return address is available from the system stack and each code block of a code stack has an address (code block address) and is associated with a particular subroutine. If the decision 502 determines that the subroutine return address does not correspond to a code block address, the return address of the subroutine is replaced 504 on the system stack with the address of a new code block which is associated with the subroutine call. Next, the original return address is saved 506 in an internal data stack. By saving the original return address in the internal data stack, the head patch processing 500 is able to return to the calling routine when the subroutine is completed. Thereafter, the new code block is placed 508 at the top of the code stack.

On the other hand, when the decision block 502 determines that the subroutine return address does correspond to a code block address, a counter associated with the corresponding code block is incremented 510. In this case, the subroutine is invoked with a non-standard call and the code stack already includes a code block (tail patch) which will return from the subroutine to the calling routine. Hence, the counter associated with the code block is incremented 510 to keep track of how many times the routine has been entered.

Following either block 508 or 510, an "entry" event is recorded 512 in a log table. This entry event is used to denote the beginning of a software routine for purposes of tracing its execution time. The head patch processing 500 is then completed and control returns to the subroutine itself by jumping 514 to the subroutine. The code associated with the subroutine is then executed and when completed returns via a tail patch to the calling routine.

Figure 6:
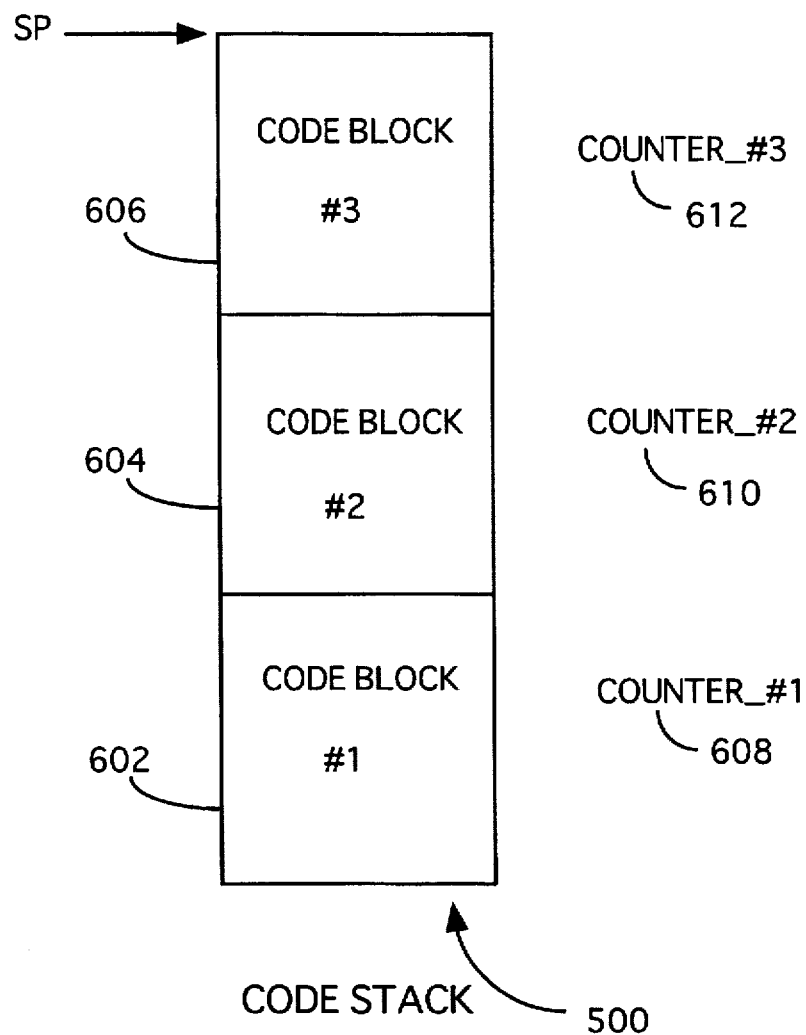
FIG. 6 illustrates an example of a code stack associated with the invention.

FIG. 6 illustrates an example of a code stack 600 associated with the invention. In FIG. 6, the code stack 600 is shown as including three code blocks, namely, code block #1 602, code block #2 604, and code block #3 606. A stack pointer (SP) points to the top of the code stack 600. Each block performs processing associated with a tail patch. The tail patch processing performed by each code block is similar except that each code block is associated with a different subroutine return address. The code blocks 602, 604 and 606 are stacked upon one another, thereby forming the code stack 600. The code stack is referred to as a "stack" because it is analogous to a data stack which is a computer architectural feature used by many microprocessors. Such stacks preferably follow Last-In-First-Out (LIFO) sequencing. The code stack 600 is executable code, thus making it quite different from the conventional data stacks which merely provide temporary data storage. The code stack 600 also has counters associated with each of the code blocks. In particular, counter #1 608 is associated with the code block #1 602, counter #2 610 is associated with code block #2 604, and counter #3 612 is associated with code block #3 606. Although not shown in FIG. 6, each of the counters preferably also has a return address storage area associated therewith for storing the original return address of the function's caller. These return address storage areas can make up the internal data stack.

Figure 7:
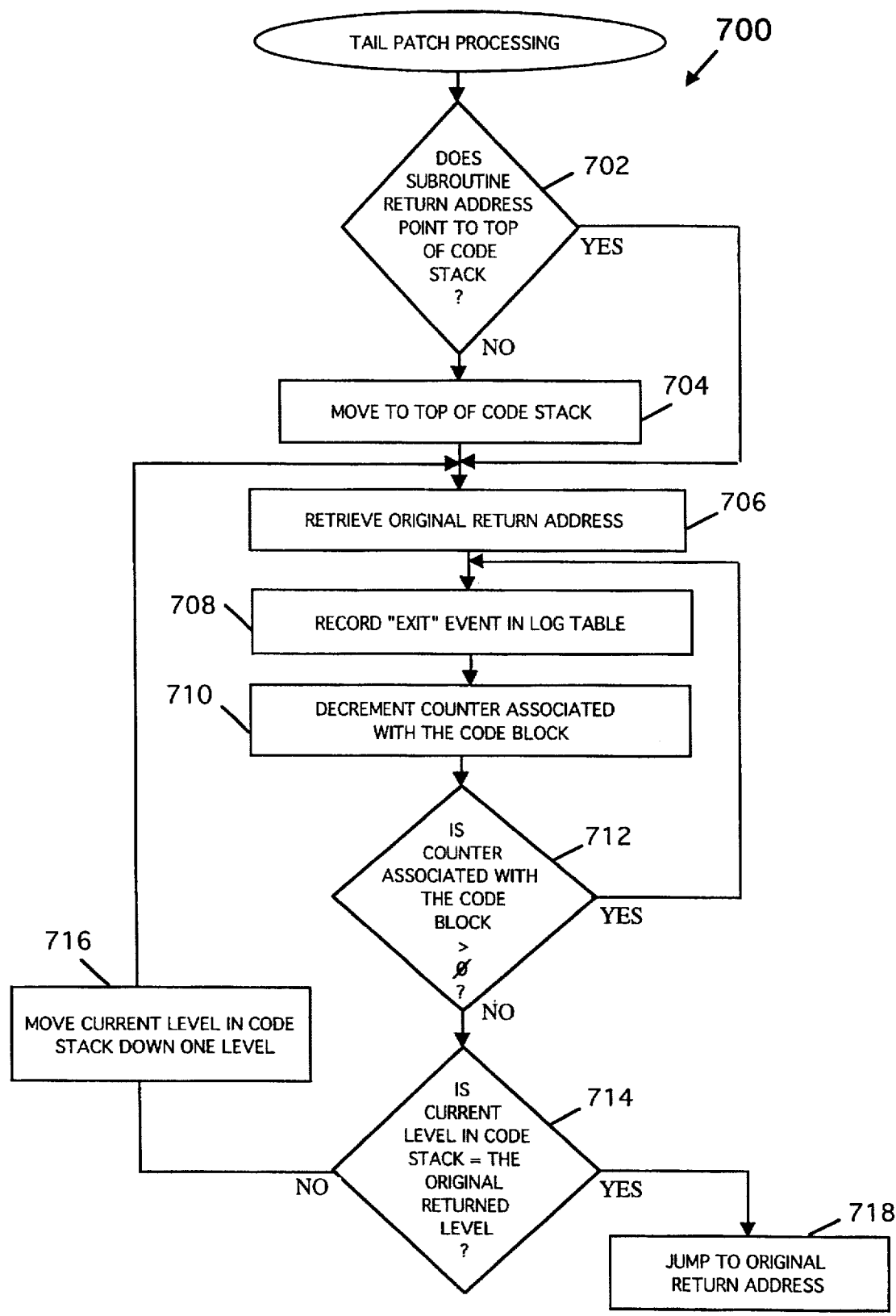
FIG. 7 is a flow chart illustrating tail patch processing according to an embodiment of the invention.

FIG. 7 is a flow chart of tail patch processing 700 according to an embodiment of the invention. The tail patch processing 700 begins with a decision block 702. The decision block 702 determines whether the subroutine return address (i.e., the address for the particular code block (tail patch), points to the top of the code stack 600. This is done by checking the current program counter (PC) against the stack pointer (SP) for the code stack. If the subroutine return address does not point to the top of the stack, it means that later called subroutines have not been properly logged out. Typically, this situation results from multiple subroutines completing at the same time with the system stack being torn down manually by the subroutines. Hence, decision 702 enables the tracing system or method to determine that subroutines have completed in non-standard ways. In this case, the tail patch processing moves 704 to the top of the code stack so that "exits" can be properly logged for each subroutine which has completed. On the other hand, if the subroutine return address already points to the top of the code stack 600, then block 704 is bypassed.

Next, an original return address is retrieved 706. Here, the original return address for the particular code block being processed is retrieved 706 from the internal data stack used to store the original return addresses. An "exit" event is then recorded 708 in the log table for the (completed) subroutine corresponding to the original return address which has been retrieved 706. The counter associated with the code block (at the top of the code stack) is then decremented 710. A decision block 712 then determines whether the counter associated with the code block is greater than zero. Here, it is assumed that the counters 608, 610 and 612 associated with the code blocks are initially one (1) when indicating only a single subroutine call for the associated subroutine return address, but are incremented for subsequent non-standard calls (see block 510 in FIG. 5). When the counter associated with the code block being processed is greater than zero, the tail patch processing 700 returns to block 708 so that the additional subroutine calls using the same subroutine return address can be logged out with exit events. Thereafter, the associated counter is again decremented 710, and the decision block 712 is again evaluated.

When the counter associated with the code block being processed becomes zero (0), a decision block 714 is carried out to determine whether the current level in the code stack 600 is equal to the original returned level. If not, then the current level in the code stack is moved 716 down one level and the tail patch processing 700 returns to repeat blocks 706–714. Once the current level in the code stack 600 is equal to the original returned level in the code stack, then the tail patch processing 700 completes by jumping 718 to the original return address associated therewith. The original returned level is the level within the code stack to which the subroutine return address pointed to. Since the code stack 600 contains executable code associated with the tail patch processing 700, block 716 need not actually move down a level in the code stack because the stack pointer (SP) will already be in the proper position.

The tail patch processing 700 thus records exit events in the logged table for the software subroutines associated with the code blocks created after the code block actually returned to. Again, when there are multiple subroutine returns associated with a single code block, each is processed so that the exit event is properly logged.

Although the invention has been described for use with a computer system having a system stack, it should be understood that the invention may be embodied in many other specific forms without departing from the spirit or scope of the invention. For instance, the invention can also be embodied for use with computer systems not utilizing a stack.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for tracing execution time of subroutines, the subroutines being executed by a computer system, said method comprising:

(a) calling a subroutine;

(b) recording a start log when the subroutine begins execution;

(c) executing the subroutine;

(d) after executing the subroutine, determining if a return from the subroutine would leave subsequently invoked and executed subroutines without an exit log;

(e) recording an exit log for the subsequently invoked and executed subroutines when said determining (d) determines that a return from the subroutine would leave subsequently invoked and executed subroutines without an exit log; and (f) thereafter recording an exit log for the subroutine.

2. A method as recited in claim 1, wherein said recording (b) is achieved by head patch code associated with the subroutine, wherein head patch code associated with the subsequently invoked and executed subroutines records a start log when the subsequently invoked and executed subroutines begin execution, and wherein said determining (d) and said recording (e) and (f) are achieved by tail patch code.

3. A method as recited in claim 2, wherein said method further comprises (g) forming a code stack prior to said executing (c), the code stack containing executable computer code including the tail patch code associated with the subroutine.

4. A method as recited in claim 1, wherein said recording (b) is achieved by head patch code associated with the subroutine, wherein head patch code associated with the subsequently invoked and executed subroutines records a start log when the subsequently invoked and executed subroutines begin execution, and wherein said determining (d) and said recording (e) and (f) are achieved by tail patch code associated with the subroutine.

5. A system for tracing execution time of subroutines, the subroutines being executed by a computer system, said system comprising:

head patch code inserted at the beginning of each subroutine to log a start indicator; and tail patch code inserted at the end of a subroutine to log an end indicator, wherein the tail patch code is arranged in one or more code blocks in a code stack, wherein when a subroutine is invoked using standard calling conventions an original return address is placed in a first temporary storage area, wherein each of the one or more code blocks having a start address, and wherein said head patch code comprises:

means for storing the original return address in a second temporary storage area;

means for placing a code block on the top of the code stack; and means for replacing the original return address stored in the first temporary storage area with a start address of the code block placed on the top of the code stack.

6. A system for tracing execution time of subroutines, the subroutines being executed by a computer system, said system comprising:

head patch code inserted at the beginning of each subroutine to log a start indicator; and tail patch code inserted at the end of a subroutine to log an end indicator, wherein the tail patch code is arranged in one or more code blocks in a code stack, wherein each of the one or more code blocks having a start address, and wherein said head patch code comprises comparison means for comparing a subroutine return address of a subroutine being invoked with the start addresses of the one or more code blocks.

7. A system as recited in claim 6, wherein the start indicators and the end indicators comprise time stamps.

8. A system as recited in claim 6, wherein when said comparison means determines that the subroutine return address matches one of the start addresses of the one or more code blocks, a count value associated with the code block having the matching starting address is incremented.

9. A system as recited in claim 8, wherein when a subroutine is invoked using standard calling conventions the subroutine return address is placed in a first temporary storage area, and wherein when said comparison means determines that the subroutine return address does not matches one of the start addresses of the one or more code blocks, said head patch code copies the subroutine return address from the first temporary storage area to a second temporary storage area, places a code block on the top of the code stack, and replaces the subroutine return address stored in the first temporary storage area with a start address of the code block placed on the top of the code stack.

10. A system as recited in claim 9, wherein said tail patch code comprises:

determination means for determining whether the corresponding address from the first temporary storage area points to the code block on the top of the code stack corresponding address from the first temporary storage area.

11. A system as recited in claim 10, wherein one or more exit events are logged for subroutines corresponding to each of the code blocks on the code stack that are above the code block pointed to by the corresponding address from the first temporary storage area.

12. A system for tracing execution time of subroutines, the subroutines being executed by a computer system, said system comprising:

head patch code inserted at the beginning of each subroutine to log a start indicator; and tail patch code inserted at the end of a subroutine to log an end indicator, wherein the tail patch code is arranged in one or more code blocks in a code stack, and wherein said tail patch processing comprises:

first logging means for logging exit events for the subroutines which have been invoked after the subroutine and exited before or currently with the subroutine for which exit events have not been logged; and second logging means for logging an exit event for the subroutine.

13. A system for tracing execution time of subroutines, the subroutines being executed by a computer system, said system comprising:

head patch code inserted at the beginning of each subroutine to log a start indicator; and tail patch code inserted at the end of a subroutine to log an end indicator, wherein the tail patch code is arranged in one or more code blocks in a code stack, wherein the subroutine return address points to one of the code blocks in the code stack, and wherein said tail patch code comprises determination means for determining whether the subroutine return address corresponds to the code block on the top of the code stack.

14. A system as recited in claim 13, wherein one or more exit events are logged for subroutines corresponding to each of the code blocks on the code stack that are newer than the code block pointed to by the subroutine return address.

15. A system as recited in claim 13, wherein said tail patch records an exit event for subroutines without an exit log although invoked after the subroutine returning was invoked, and then records an exit log for the subroutine.

16. A system for tracing execution time of subroutines, the subroutines being executed by a computer system, said system comprising:

means for recording a start log when a subroutine begins execution;

determination means for determining, after executing the subroutine, whether a return from the subroutine would leave one or more subsequently invoked and executed subroutines without an exit log;

means for recording an exit log for the one or more subsequently invoked and executed subroutines when said determination means determines that a return from the subroutine would leave one or more subsequently invoked and executed subroutines without an exit log; and means for recording an exit log for the subroutine.

17. A system for tracing execution time of software subroutines, said system comprising:

a storage system for storing a program and software subroutines, the program utilizing one or more of the software subroutines, and the program and the software subroutines having executable instructions; and a CPU for executing the executable instructions, wherein said storage system is arranged so as to include at least:

head patch code for each of the software subroutines executed by said CPU;

a system stack for storing a subroutine return address, the subroutine return address being one of an address of tail patch code for certain software subroutines being executed by said CPU and an original return address for the certain software subroutines being executed by said CPU;

an internal data stack for storing the original return address for the certain software subroutines being executed by said CPU; and a code stack for storing executable code blocks in a stack, the executable code including the tail patch code for each of the certain software subroutines being executed by said CPU.

18. A system as recited in claim 17, wherein each of the one or more code blocks having a start address, and wherein said head patch code comprises:

computer code for comparing the subroutine return address for a subroutine being invoked with the start addresses of the one or more code blocks on said code stack; and computer code for incrementing a count value associated with the code block having the matching starting address when said comparing determines that the subroutine return address matches one of the start addresses of the one or more code blocks, or placing a code block on the top of said code stack when said comparing determines that the subroutine return address does not matches one of the start addresses of the one or more code blocks.

19. A system as recited in claim 18, wherein said tail patch code comprises:

computer code for determining whether the subroutine return address corresponds to the code block on the top of said code stack, and computer code for logging one or more exit events for subroutines corresponding to each of the code blocks on said code stack that are newer than the code block pointed to by the subroutine return address when said first code determines that the subroutine return address does not correspond to the code block on the top of said code stack.

20. A computer readable medium containing program instructions for tracing execution time of subroutines, said computer readable medium comprising:

computer readable code devices for recording a start log when a subroutine begins execution;

computer readable code devices for determining, after executing the subroutine, whether a return from the subroutine would leave one or more subsequently invoked and executed subroutines without an exit log;

computer readable code devices for recording an exit log for the one or more subsequently invoked and executed subroutines when said determination means determines that a return from the subroutine would leave one or more subsequently invoked and executed subroutines without an exit log; and computer readable code devices for recording an exit log for the subroutine.

* * * * *